United States Patent [19]

Lubins et al.

[11] Patent Number: 5,024,510
[45] Date of Patent: Jun. 18, 1991

[54] CARTRIDGE HOLDER SYSTEM

[76] Inventors: Paula M. Lubins, 1199 Glendon, Maplewood, Minn. 55119; John C. Mroszak, Box 306, Soudan, Minn. 55782

[21] Appl. No.: 248,581

[22] Filed: Sep. 26, 1988

[51] Int. Cl.⁵ .................. G02B 27/00; G11B 17/04
[52] U.S. Cl. .................. 350/321; 369/178; 360/98.01; 360/98.07; 360/132; 312/111
[58] Field of Search .............. 350/241, 321, 245, 250; 221/87, 90; 360/132, 133, 134, 98.01, 98.07, 137; 312/111, 117, 119, 120, 133, 235.1, 322; 369/178, 177

[56] References Cited

U.S. PATENT DOCUMENTS

| | | | |
|---|---|---|---|
| 3,603,478 | 9/1971 | Connan | 221/87 |
| 3,666,337 | 5/1972 | Sztorc | 312/111 |
| 3,811,745 | 5/1974 | Cylke | 221/87 |
| 4,614,474 | 9/1986 | Sudo | 369/178 |
| 4,814,913 | 3/1989 | Mihara et al. | 360/98.07 |
| 4,893,205 | 1/1990 | Hoppe et al. | 360/98.01 |

Primary Examiner—Bruce Y. Arnold
Assistant Examiner—Loha Ben
Attorney, Agent, or Firm—Jacobson and Johnson

[57] ABSTRACT

A system for storing and selectively retrieving a recorded program on a cassette cartridge having an information disk for storing identification indicia on a recorded program, an information disk viewer for viewing the information stored on the information disk, and a storage rack for holding cartridges containing identification information with the storage rack including a rear shelf for holding cartridges in a vertical position to expose the identification information on cartridges located on the rear shelf and a front compartment for holding cartridges in a vertical position for viewing the identification information on the cartridge with the front compartment pivotable and slidable to permit the user to convert the front compartment from a vertical position to a horizontal position to permit a user to remove a cartridge located on the rear shelf without having to remove a cartridge located in the front compartment.

17 Claims, 6 Drawing Sheets

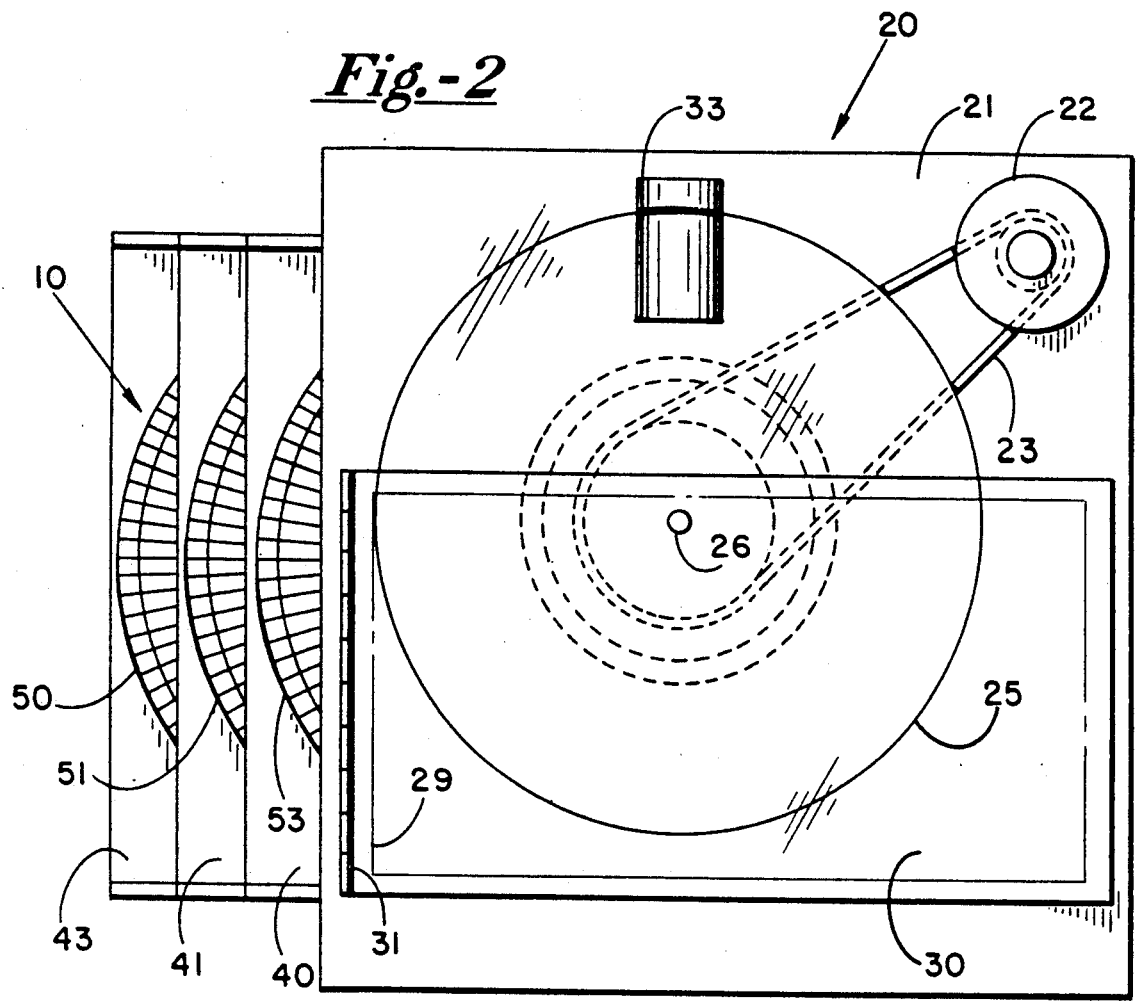
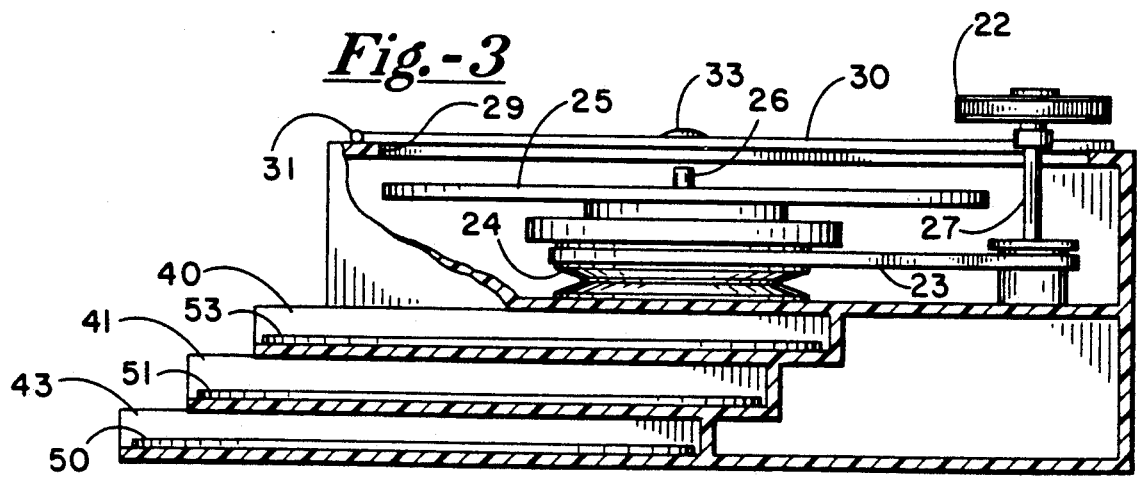

CARTRIDGE HOLDER SYSTEM

BACKGROUND OF THE INVENTION

1. Field of the Invention

This invention generally relates to cartridge holding systems and more specifically, to cartridge holding systems that permit the user to quickly catalog, store, and retrieve videocassettes.

2. Description of the Prior Art

The concept of cartridge holders is well known in the art. Typically, the cartridge holders contain shelves for holding the cartridge in a position where viewers can read the label on the cassette or the cartridge holder. One of the problems with storage of videocassettes is that numerous programs are often stored on the same videocassette tape and at different locations on the tape. To find a particular program, one runs the tape forward until the desired program appears or by locating the program on the videocassette tape through the locating index displayed on the videocassette recorder (VCR). The present invention provides a storage system and indexing system that permits the user to quickly identify the location of a particular program and to quickly retrieve the videocassette from the usually crowded cabinet located under the television set.

The sztorc U.S. Pat. No. 3,666,337 shows a cartridge holder for holding and storing cassette cartridges with the holder displaying the cartridges in an upwardly tilted arrangement in the open position and to store the cartridges in a vertical position.

The Hobbs U.S. Pat. No. 931,426 shows a cabinet for holding phonograph records and indexes that permit the storage of the phonographs by consecutive numbers or titles. The index system being located on the inside of the cover to the storage cabinet.

The Connan U.S. Pat. No. 3,603,478 shows a tape cassette holder that has leaf springs to urge the cassette out of the holder when the lid is opened.

The Held U.S. Pat. No. 4,001,891 shows a readout device for indicating the program being played by an eight-track tape cartridge. The indicator is mounted within the cartridge so that rotation of the tape drives an external four-sided indicator shaft that displays each of the four programs on four separate faces.

The Goldstein U.S. Pat. No. 3,434,658 shows a rotary indicator that can be incorporated into a book or periodical without substantially increasing the thickness of the publication by an amount greater than the thickness of the two sheets used to form the indicator into the publication.

BRIEF SUMMARY OF THE INVENTION

Briefly, the present invention comprises a cassette storage and location system including a rotatable information wheel where the titles of the programs can be stored in alphabetical order, a viewer and information disk storer to display the information on the information disk and a videocassette storage rack to fit in a cabinet located under the television set to permit the user to readily see two rows of videocassettes displayed with identification information.

BRIEF DESCRIPTION OF THE DRAWINGS

FIG. 2 is a top view of the information disk display viewer;

FIG. 3 is a sectioned side view of the information disk display viewer of FIG. 2;

DESCRIPTION OF THE PREFERRED EMBODIMENT

Figure 1:
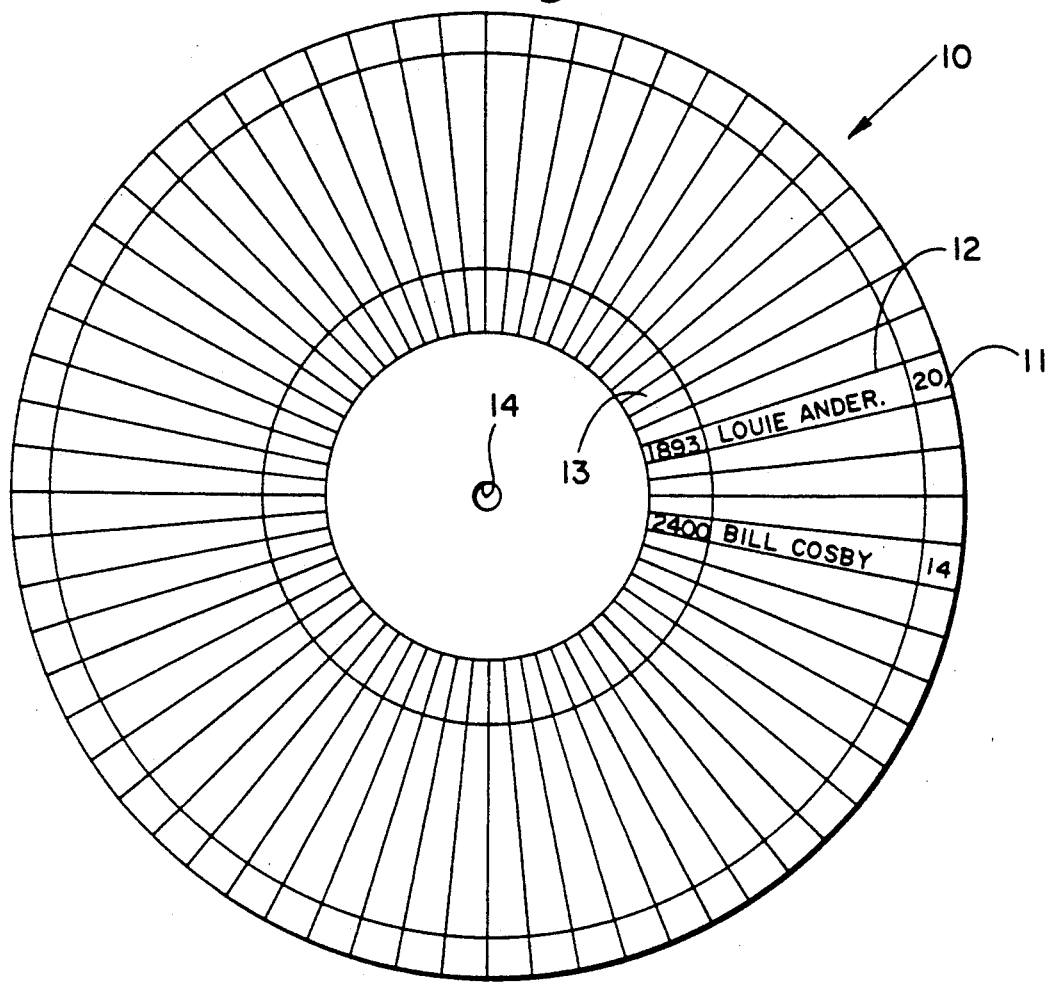
FIG. 1 is a top view of an information disk for use in our invention.

Referring to FIG. 1, reference number 10 identifies the circular rotatable information disk for storing information on the title of a recorded program, the location of the recorded program on the videotape, and the videocassette cartridge where the program is located. Information disk 10 has a circular central opening 14 for mounting on a turntable similar to the manner records are mounted on a turntable. The top surface of information disk 10 includes three discrete annular regions for entering information on the recorded videocassette program. Each of the annular regions is divided into radial segments for entering information on one recorded program. The inner annular region 13 shows the tape location, the middle annular region 12 contains a short descriptive title of the recorded program and the outer annular region 11 identifies the videocassette cartridge that the program is located on. For example, the listing "1893 Louie Ander. 20" indicates that the recorded program on Louie Anderson is located on videocassette cartridge number 20 and at the location marker 1893. Knowing the information on the location of the particular program permits the user to quickly find the selected program on a videocassette tape that may contain many different programs.

In order to read and store the information disks we provide a viewer. FIGS. 2 and 3 show viewer 20 for storing and viewing the information contained on the information disks. Viewer 20 comprises a top transparent panel 21 that permits information disks mounted on turntable 25 and centering pin 26 to be seen by a person looking down at viewer 20. To operate the viewer the user lifts up hinged transparent panel 30 which is hinged to top surface 21 by hinge 31. The user then places the information disk through opening 29 and on turntable 25. The user can then rotate turntable 25 through a thumbwheel 22 that connects to turntable 25 through a shaft and pulley 27, a drive belt 23 and drive pulley 24. By rotating the information disk while peering through a magnifier 33, the operator can quickly scan through the entire list of stored programs to find the selected program. After finding the program the user can remove and store the information disk in the lower portion of the viewer cabinet storage area that contains three stepped compartments 40, 41, and 43. Each of the compartments holds a single information disk with a portion of each information disk visible from above the viewer. By color coding the disks or placing other information identification on the disk, the user can quickly select the proper disk. For example, information disk 53 could be for sporting activities, information disk 51 for movies and information disk 50 for children's programs. Thus, each of the categories of videocassette programs can be entered on a single disk to facilitate general subject locating of a program. While we have shown turntable 25 driven by a thumbwheel 22, if desired an electric motor drive can be connected to drive pulley 24 to provide continuous or intermittent rotation of turntable 25.

One of the difficulties is that the storage space in a television cabinet is usually not very high but is relatively deep. This type of arrangement makes it difficult to store videocassette cartridges in a position where the user can easily view the identification label on the cartridge. In order to overcome this difficulty, we provide a storage rack that permits both horizontal and vertical storage of the videocassette cartridges.

Figure 4:
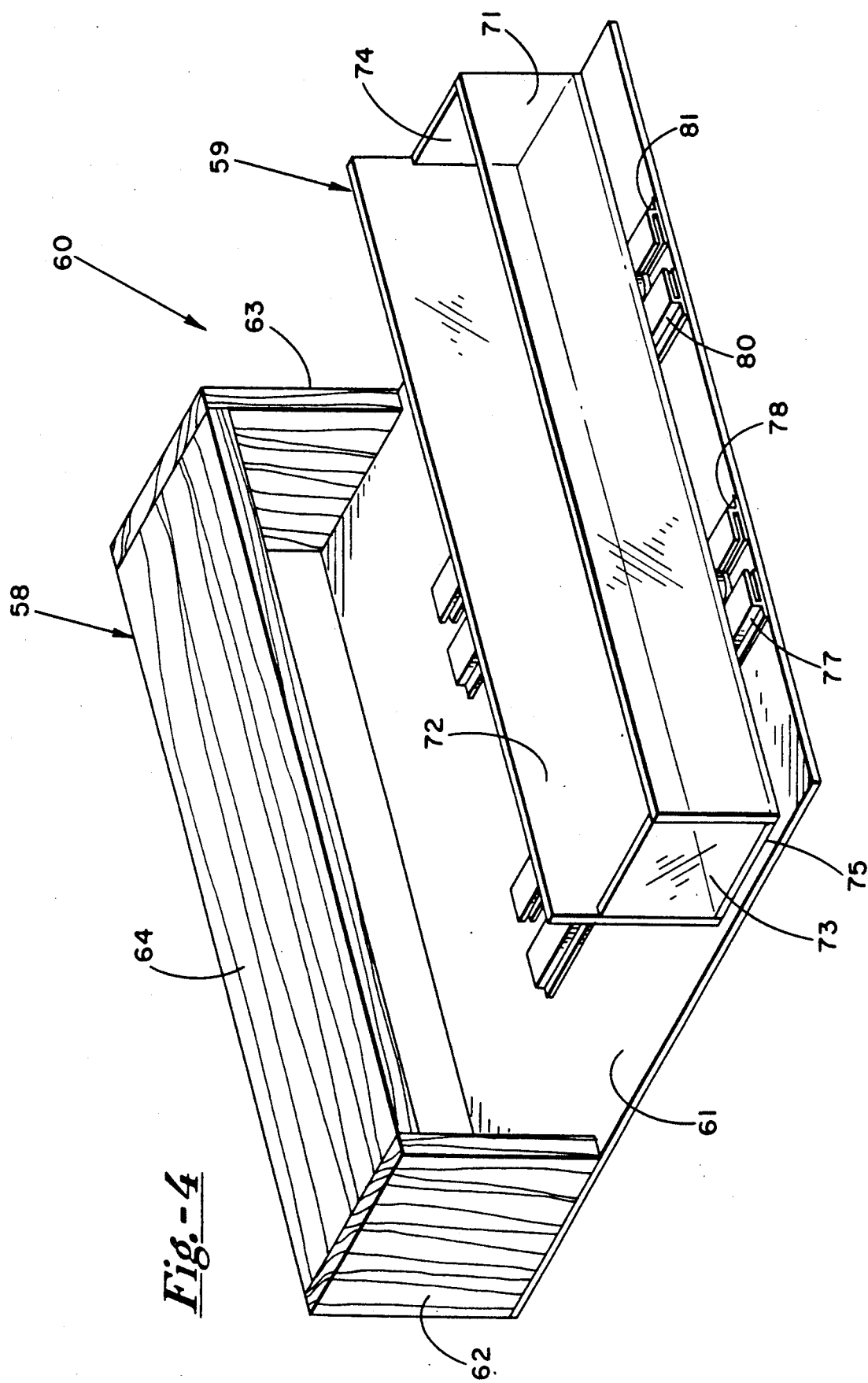
FIG. 4 is a perspective view of the videocassette rack for storing videocassettes in a cabinet located under a television set.

FIG. 4 shows a storage rack 60 having a rear storage shelf 58 mounted to a platform 61 through sides 62 and 63 connected by a top board 64. The rear storage shelf is permanently mounted to platform 61 and holds videocassette cartridges in a vertical orientation at the back of a storage cabinet.

Located at the front of the storage rack 60 is a front videocassette compartment 59 that is both slidable and rotatable to permit holding videocassette cartridges in a horizontal or vertical orientation. Compartment 59 comprises a back panel 72, a transparent front panel 71, transparent sides 73 and 74, and a bottom panel 75. The panels coact to form an open container that snugly or confiningly holds a videocassette cartridge in the compartment. The transparent panels also permit the user to read information located on any portion of the front edge of a videocassette.

Figure 5:
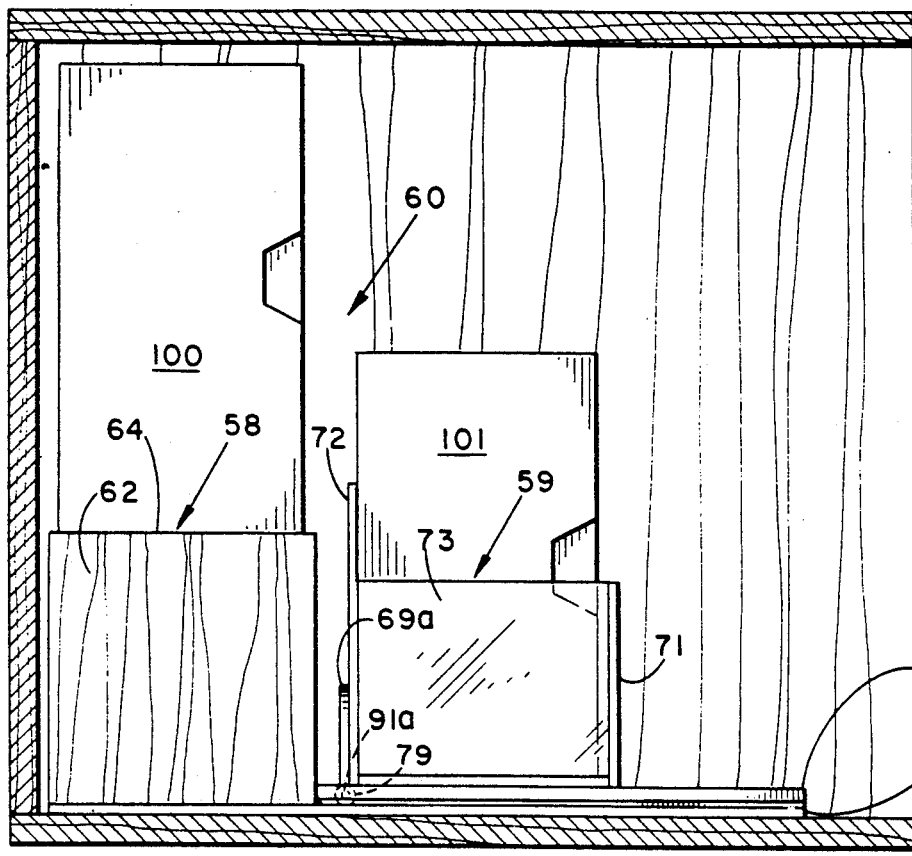
FIG. 5 shows a side view of the videocassette rack with the videocassettes located in a vertical position.
Figure 6:
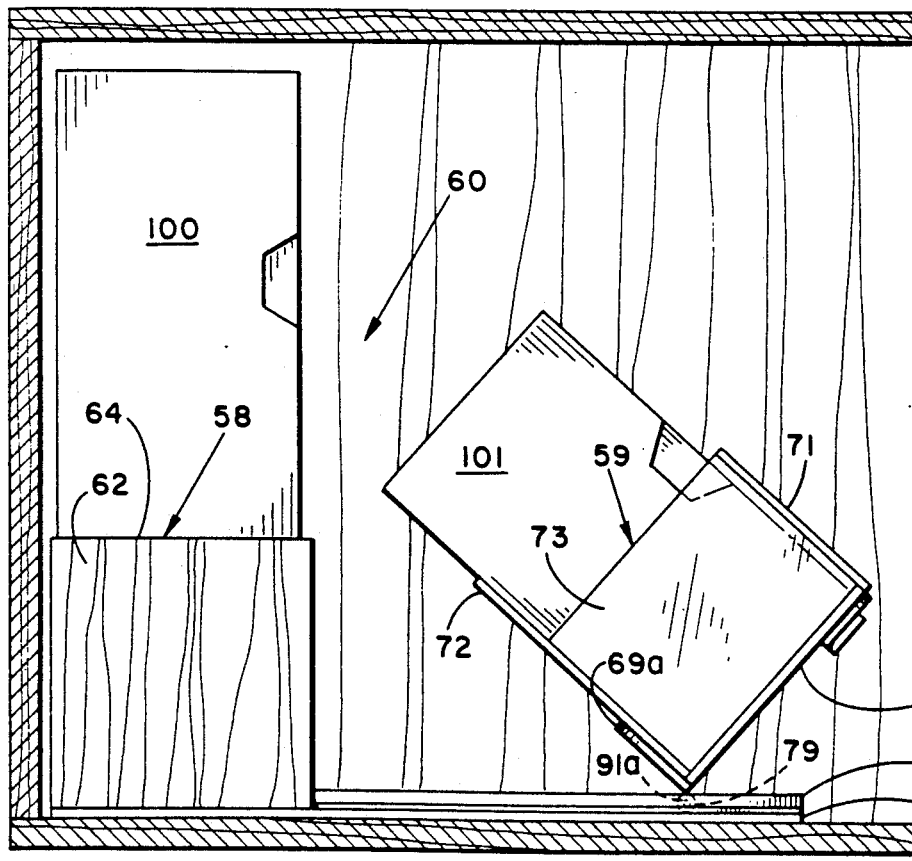
FIG. 6 shows a side view of the videocassette rack as front compartment is being rotated to a horizontal position.
Figure 7:
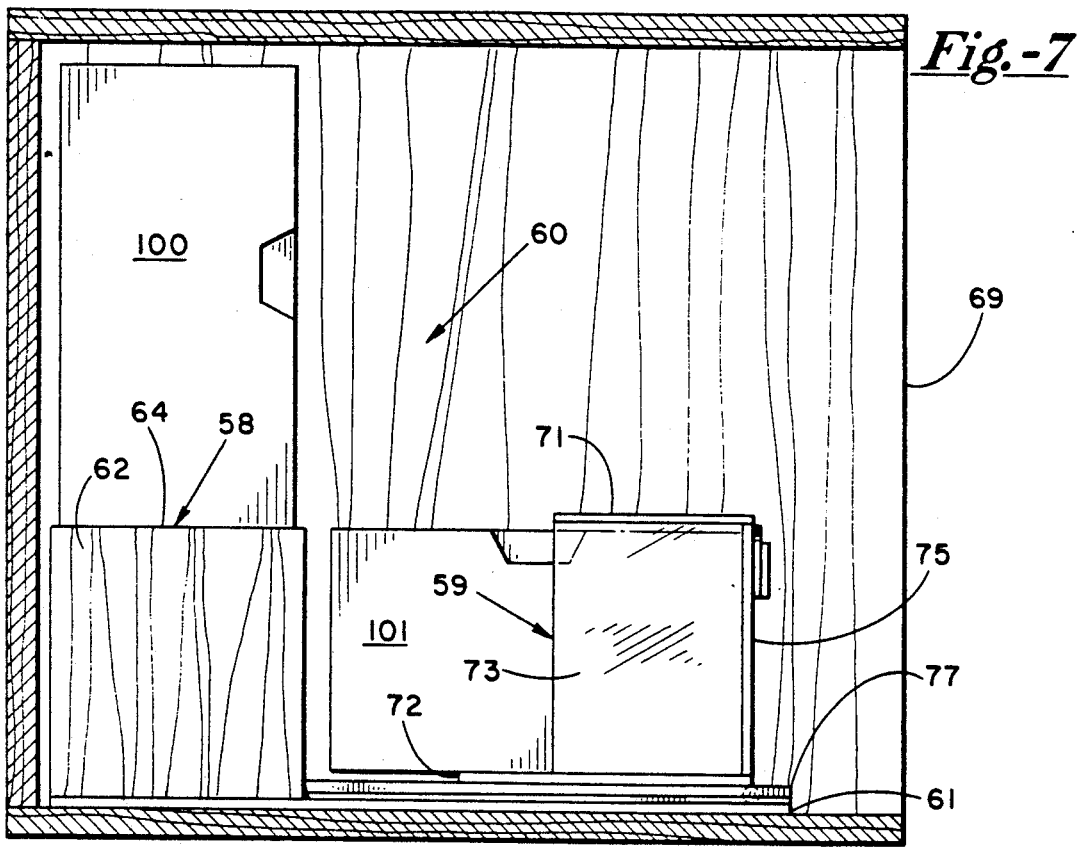
FIG. 7 shows a side view of the videocassette rack with the front compartment located in a horizontal position.
Figure 8:
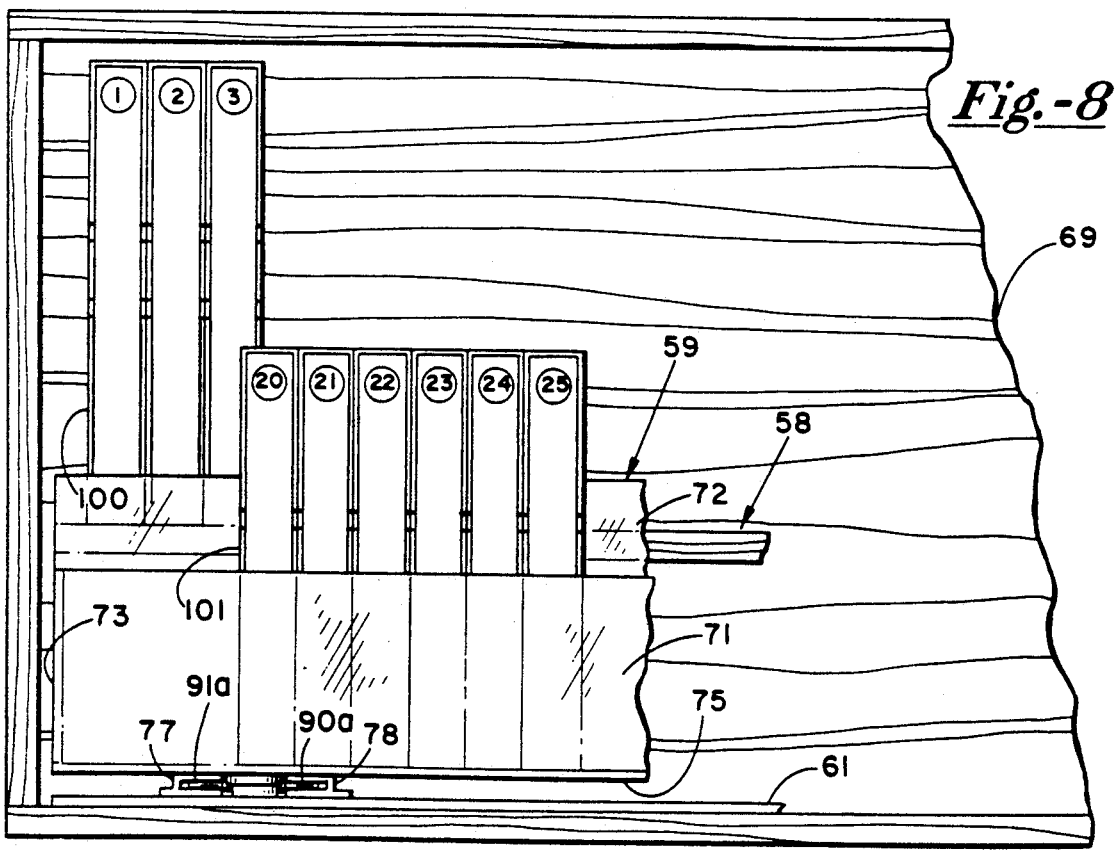
FIG. 8 shows a front view of the storage rack illustrating the videocassettes stored in the videocassette rack.

Referring to FIG. 5, Fig. 6, and FIG. 7 the various positions of the front compartment are illustrated by side views. FIG. 5 shows a side view with a videocassette cartridge 100 located on the rear storage shelf 58 and a videocassette cartridge 101 located in a vertical position in front compartment 59. FIG. 6 shows the front compartment 59 partially rotated from the vertical position and with the compartment slid forward. That is, a hinge 79 which is shown in greater detail in FIG. 9 permits the user to pivot front compartment 59 with its contents to a position where the compartment 59 holds the videocassette cartridges in a horizontal position. FIG. 7 illustrates front compartment 59 in the horizontal storage position with the videocassette cartridge 101 therein located in a horizontal position. The purpose of having a front compartment 59 that is movable and pivotable is to permit the user to obtain access to the videocassette cartridges located on the rear storage shelf 58 while allowing the information on the videocassette cartridges on both the front compartment and the back shelf to be displayed in a manner that a user can readily see the identification indicia. A reference to FIG. 8 shows a plurality of videocassette cartridges located on the rear storage shelf 58 and in the front compartment 59 with the identification information located on the top portion of each videocassette located within the videocassette cartridge. The information is visible on both rows of videocassette cartridges. The difficulty in storing videocassette cartridges in such a manner is that the dimensions of the television cabinets prevent the videocassette cartridges located in the back row from being removed without removing the videocassette cartridges in front of the rear videocassette cartridges. To remove a videocassette cartridge from the rear row with the present invention the user merely tips the entire front compartment 59 to the horizontal position. With the videocassette cartridges in the horizontal position, as shown in FIG. 7, the user can quickly and easily remove the videocassette cartridge from the rear shelf 58.

Figure 9:
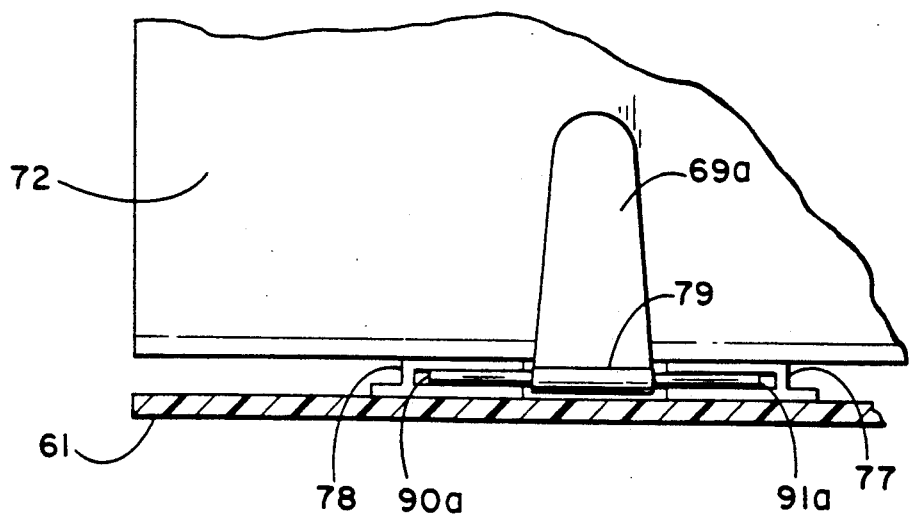
FIG. 9 shows a detail of the sliding hinge that permits the front compartment to be rotated and slide in or out.

Referring to FIG. 9, one of the hinges 79 for tipping compartment 59 is shown in greater detail. Hinge 79 connects to back panel 72 of compartment 59 through a member 69a that has a cylindrical pivot rod 91a extending from one side and a cylindrical pivot rod 90a extending from the opposite side. The pivot rod 90a slides in a U-shaped opening located in strip 77 and the pivot rod 90a slides in a similar U-shaped opening located in strip 78. The mounting of the strips on platform 61 permits the user to slide the pivot rods forward or rearward and the circular cylindrical shape of the pivot rods permits the user to rotate the front compartment from a horizontal to a vertical position or vice versa. An identical hinge is located on the other end of compartment 59 and mounts in an identical manner in U-shaped strips 80 and 81 (FIG. 4).

Figure 10:
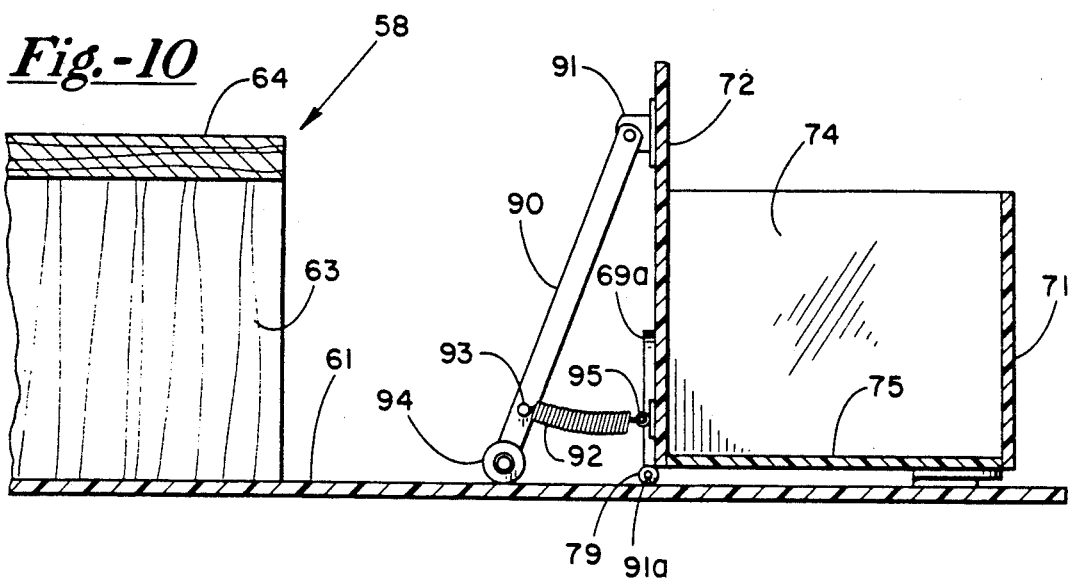
FIG. 10 shows an assist device for tilting the front compartment.

Referring to FIG. 10, an assist device is shown attached to back panel 72 of compartment 59. Assist device comprises a member 91 attached to back panel 72 with member 91 having a pivotal connection to one end of leg member 90. The other end of leg member 90 includes a roller 94 that rolls along platform 61. A tension spring 92 has one end that connects to post 93 on member 90 and a second end that connects to eye 95 on back panel 72.

Figure 11:
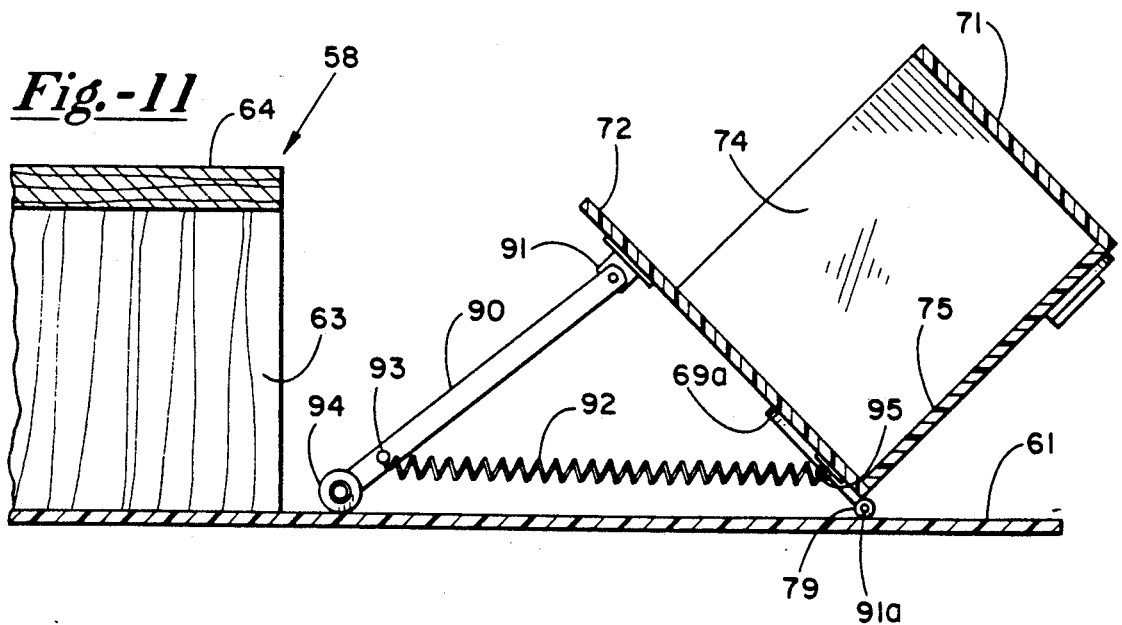
FIG. 11 shows the assist device of FIG. 10 as the front compartment is tilted.

In tilting the compartment which is loaded with video cassettes it is sometimes desirable to provide a gentle lowering of the compartment to avoid damaging the video caseettes or spilling the cassettes from the compartment. In operation of the present invention with the assist device, the user grasps compartment 59 and tilts the compartment backward about pivot rod 91. As the compartment 59 is tipped back member 90 is forced rearward. As member 90 is forced rearward as shown in FIG. 11, it causes the tension spring 92 to elongate and provide a counterbalance force to the tipping action. The tension of spring 92 is such that it will not prevent one from tilting the front compartment to the horizontal but will provide a compensating force so that a portion of the weight of the video cassettes is supported by the assist device. While the assist device provides a portion of the support for tilting compartment 59 to the horizontal position, it also provides a portion of the force necessary to tilt the compartment from the horizontal to the vertical position.

We claim:

1. A system for storing and selectively retrieving a recorded program on videocassette comprising:

an information disk for storing identification indicia on a recorded program;

an information disk viewer for viewing the information stored on said information disk; and a storage rack for holding videocassettes or videocassette cartridges containing identification information, said storage rack including a first rear shelf for holding videocassettes or videocassette cartridges in a vertical position to expose the identification information on videocassettes or videocassette cartridges located on said rear shelf, a front compartment for holding videocassettes or videocassette cartridges in a vertical position for viewing the identification information on the cartridges, said front compartment having means for tipping said front compartment from a vertical position to a horizontal position to permit a user to remove a videocassette located on said rear shelf without having to remove a videocassette or videocassette cartridge in said front compartment.

2. The system of claim 1, wherein said viewer includes a set of offset compartments to permit storage of multiple information disks with at least a portion of the information disk exposed to the viewer.

3. The system of claim 2, wherein said viewer includes a magnifier to magnify the information on the information disk.

4. The system of claim 2, wherein said viewer includes a turntable to rotate said information disk to a position where the information disk can be viewed by said user.

5. The system of claim 4, wherein said information disk includes a plurality of annular information segments for entering information on said recorded program.

6. The system of claim 5, wherein said rear shelf and said front compartment are located on a platform with said rear shelf spaced from said platform and said front compartment located on said platform.

7. The system of claim 6, wherein said means for tipping said front compartment includes a slidable hinge to permit sliding and tipping of said front compartment.

8. The system of claim 7, wherein said front compartment includes a pocket area for snugly holding a videocassette cartridge therein.

9. The system of claim 8, wherein said turntable includes a thumbwheel to rotate said turntable.

10. The system of claim 9, wherein said viewer includes a cover for placing over said information disk when the viewer is in use.

11. A system for storing videocassettes having an information surface to permit selection of a videocassette comprising:

an information storage region remote from said videocassette, said storage region containing information identifying the videocassette, the title, and the location of a video program on said videocassette; and a storage rack for storing videocassettes in a vertical orientation to permit a user to readily see identification information located on the information surface of the videocassette, said storage rack including a first means for holding a front row and a rear row of videocassettes and a second means for changing orientation of the front row of the videocassettes to permit access to the rear row of videocassettes without having to remove an individual videocassette from the front row.

12. The system of claim 11, including an assist device attached to a portion of said second means to assist said user in tilting said front row.

13. A storage rack for holding videocassettes or videocassette cartridges containing identification information, said storage rack including a first rear shelf for holding videocassettes or videocassette cartridges in a vertical position to expose the identification information on videocassettes or videocassette cartridges located on said rear shelf, a front compartment for holding videocassettes or videocassette cartridges in a vertical position for viewing the identification information on the cartridges, said front compartment having means for tipping said front compartment from a vertical position to a horizontal position to permit a user to remove a videocassette located on said rear shelf without having to remove a videocassette or videocassette cartridge in said front compartment.

14. The storage rack of claim 13, including an assist device to provide support for said front compartment as said user tilts said front compartment.

15. A system for storing and selectively retrieving information of a program recorded on videocassette comprising:

an information disk for storing identification indicia on a recorded program, said information disk including at least three annular regions, a first annular region for placing the name of a program, a second annular region for placing the identification indicia of the videocassette program and a third annular region for identification of the videocassette cartridge the program is located on, and a storage means having access means for storing and removing said information disk.

16. The system of claim 15, including an information disk viewer for viewing the information stored on said information disk.

17. The system of claim 16, including a hole in said information disk for mounting said information disk on said viewer.

* * * * *